United States Patent
Blumberg

(10) Patent No.: US 7,436,536 B2
(45) Date of Patent: Oct. 14, 2008

(54) SYSTEM AND METHOD OF PROVIDING PROOF OF DELIVERY

(76) Inventor: Marvin R. Blumberg, 7105 Broxburn Dr., Bethesda, MD (US) 20817

(*) Notice: Subject to any disclaimer, the term of this patent is extended or adjusted under 35 U.S.C. 154(b) by 686 days.

(21) Appl. No.: 10/964,688

(22) Filed: Oct. 15, 2004

(65) Prior Publication Data
US 2005/0094199 A1    May 5, 2005

Related U.S. Application Data

(60) Provisional application No. 60/511,098, filed on Oct. 15, 2003.

(51) Int. Cl.
*G06F 15/00* (2006.01)
*H04N 1/00* (2006.01)
*A47G 29/14* (2006.01)

(52) U.S. Cl. .......... 358/1.15; 358/400; 232/27; 232/31

(58) Field of Classification Search .......... 358/1.9, 358/1.15, 400; 705/1, 404, 410, 39; 422/292; 283/58; 235/75; 713/170; 232/27, 31
See application file for complete search history.

(56) References Cited

U.S. PATENT DOCUMENTS

| | | | |
|---|---|---|---|
| 5,121,945 A | 6/1992 | Thomson et al. | 283/58 |
| 5,313,404 A | 5/1994 | Wu | 364/478 |
| 5,861,805 A | 1/1999 | Reeves | 340/539 |
| 5,898,153 A | 4/1999 | Lagan et al. | 235/375 |
| 6,182,219 B1 | 1/2001 | Feldbau | 713/176 |
| 6,477,514 B1 | 11/2002 | Gil | 705/410 |
| 6,483,433 B2 | 11/2002 | Moskowitz | 340/568.1 |
| 6,571,334 B1 | 5/2003 | Feldbau et al. | 713/170 |
| 6,928,422 B2 | 8/2005 | Sansone | 705/406 |
| 2002/0054334 A1 | 5/2002 | Harrison et al. | 358/1.15 |
| 2002/0120562 A1 | 8/2002 | Opiela et al. | 705/39 |
| 2003/0085266 A1 | 5/2003 | Simon | 232/27 |
| 2003/0103881 A1* | 6/2003 | Lane et al. | 422/292 |
| 2004/0254802 A1 | 12/2004 | Miller | 705/1 |
| 2005/0075989 A1* | 4/2005 | Biasi et al. | 705/404 |
| 2005/0198511 A1 | 9/2005 | Tomkow | 713/176 |
| 2008/0021725 A1* | 1/2008 | Kara et al. | 705/1 |

FOREIGN PATENT DOCUMENTS

| | | |
|---|---|---|
| DE | 19612647 | 10/1997 |
| DE | 19739561 | 3/1999 |
| DE | 19845811 | 4/2000 |
| DE | 19950801 | 4/2001 |

* cited by examiner

*Primary Examiner*—Edward L. Coles
*Assistant Examiner*—Charlotte M Baker
(74) *Attorney, Agent, or Firm*—Jacobson Holman PLLC

(57) ABSTRACT

A record of a document is transmitted to a receiver so as to provide proof of transmission of the document by delivery of the to be transmitted document to a secure delivery box which provides a copy of all documents being transmitted to the sender and/or the recipient and/or the service provider of the delivery box by a hard copy or electronic copy of the documents inserted into the delivery box with the sender's address being visible through a transparent window of the to be delivered document or entered by an external keyboard of the delivery box so that copies and confirmation of delivery of transmitted documents is achieved.

15 Claims, 2 Drawing Sheets

SYSTEM AND METHOD OF PROVIDING PROOF OF DELIVERY

This application claims priority from and the benefit of U.S. Provisional Application Ser. No. 60/511,098, filed on Oct. 15, 2003.

FIELD OF THE INVENTION

According to the system and method of the present invention, evidence is provided of an attempt to deliver important documents sent by mail, courier or electronic mailing by providing proof of the date, subject matter and complete copies of the documents being forwarded to an intended recipient.

BACKGROUND OF THE INVENTION

Important documents, such as tax returns, notices and checks are usually sent with a return receipt requested, which is confirmation that a letter was received. However, acknowledgment that something was received, such as a sealed letter, is not proof as to the contents of the letter.

There is therefore a substantial need for proof of delivery for the contents of a mailing. This would require that a copy be reproduced or provided of a handwritten, typed, printed or electronic material forwarded to another party.

SUMMARY OF THE INVENTION

The following describes the method and procedures for establishing proof of delivery to a mail delivery service, such as the post office or a courier service, for example.

For this part of the description it is assumed that just one check is to be sent with a cover page, to which the check is attached. The cover page provides the pertinent information regarding the purpose of the check, e.g., the name of the sender, invoice number, amount being transmitted, a reference to any document, such as a tax return or real estate tax, etc. More than one type of form for this information may be offered to the sender, e.g., a form which is customized for such matters as an income tax return, or an invoice for a payment of a bill, or a bill that is a payment which is required periodically, e.g., a mortgage payment.

The cover page would include a transparent pouch. The pouch would be so designed that the user could insert the check and identifying indicia being sent into the pouch. The pouch permits a copy to be made of the check and cover page, that is, while the cover page is moving past a copy device. The check or the pouch would not interfere with the operation of the copy device.

The cover page would have a designated space for the name and address of the sender and also for the recipient. There would be a separate space on the pouch to write and attach additional information.

The cover page would then be taken to a secure, sealed delivery box. The cover page would be fed into a slot in the box by the sender. This slot provides access to a copy device contained in the box. Once the sender places the cover page into the slot, the cover page cannot be retrieved by the sender. This provides additional certainty that the original documents sent are the same as that which are received.

After being placed into the slot, a conveyor device would cause the cover sheet to move past the copy device. The slot, the conveyor mechanism that causes the cover page to move and the copy device are similar to that found on a typical copy machine, a fax machine or automatic document fed scanner.

A copy of the cover page would be made by the copy machine and delivered from an exit port to the sender of the cover page. This would be one part of the proof for the sender that the document was sent. In addition to receiving this copy the sender may request that an electronic copy (an "e-mail") be sent to at least one of the intended recipient, which would inform the recipient that the check and cover page have been sent, to the sender as confirmation of sending and to the custodian of the delivery box to ensure against tampering or fraud. The sender may also request that the recipient notify the sender and the carrier if the cover page is not received.

The carrier of the document which controls the delivery box would also keep a record of all transactions by recording them on tape and/or storing them digitally and/or sending an e-mail confirmation of the transaction to an electronic storage device of the carrier. This would help protect the carrier against charges of mishandling the transaction.

After the electronic copy is made, a conveyor mechanism causes the cover page (if not suitable to be mailed in its present form) to move into an envelope or to be enclosed by a top sheet and a bottom sheet so that an envelope is formed around the cover page. An opening or a transparent section is provided in the envelope or on the top sheet so that the name and address of the sender and of the recipient are visible. The addresses could have been written or typed on the cover page by an external keyboard and monitor forming part of an exterior of the delivery box.

Alternatively, the copy machine would select a delivery box/package based upon the total number of pages being transmitted. The stacked pages of the original document would be conveyed into the selected box with delivery and return address information printed on the top of the box as entered from the external keyboard.

Alternatively, the pouch or envelope may be transparent on one side and the address and name of the sender and recipient may be written or typed on the other side. After the electronic copy is made of both sides, the pouch or envelope can be caused to fold and sealed closed in the folded position as it passes over the conveyor so that the information on the transparent side is kept private.

The user can press a series of buttons or the keyboard on the exterior of the delivery box into which the cover page was placed to key in different types of information. This gives the sender the opportunity to type the name and address of the sender and the recipient and indicate the type of delivery desired, e.g., standard overnight, priority overnight, Saturday, Sunday, holiday, with or without a return receipt.

A method of payment would be included in the delivery box, such as a credit card reader. The user would insert their credit card, and then, based upon the type of delivery selected and the area code of the recipient, which the user could enter by pressing a numeric key pad of the keyboard on the delivery box or be read automatically from the deposited documents by a scanner. An appropriate charge would be made to the credit card. Upon request, a receipt would automatically be issued.

A cash receiving machine could also be attached to the delivery box for payment by cash. Similarly, a receipt would be issued.

A plurality of pages may be included in the document sent to the recipient. This would be done by sending the pages electronically ("e-mail") or by sending the originals of a series of pages after they are copied on the copy machine. An envelope may be fed to the copy machine inside the delivery box so that the series of original pages and the series of copied pages are placed in separate envelopes. A shipping label may be typed on the keyboard outside of the delivery box. Also, a check may be sent through the mail with proof given to the sender by a copy of the check inserted in the delivery box or proof of mailing of a check may be sent electronically by the sender to an intended recipient.

The sender may satisfy the carrier that funds are in his account in advance of the transaction or during the transaction. The sender could then direct the carrier to move those funds from the sender's account to the recipient's account or the sender may (by the input of an I.D. card and "pin" numbers) cause a payment to move from the sender's bank account to the recipient's bank account. It is intended that this sophisticated method of making a payment in a secure electronic manner would be made available to people at a public place, such as a post office or a commercial carrier's facility.

In the above description the "carrier" referred to above is the party providing the secure delivery box described above, the facility where it is made available to the sender, and is also making the delivery of the document to the recipient, a copy to the sender and to the carrier's own electronic storage device as proof of receipt of certain documents. Of course, there may be more than one party involved in the duties described for the "carrier".

Accordingly, it is an object of the present invention to provide a record of a document being transmitted to a receiver so as to provide proof to the sender of transmission of the document.

It is another object of the present invention to provide a record of a document being transmitted to a receiver so as to provide proof of transmission of the document by delivery of the to be transmitted document to a secure delivery box which provides a copy of all documents being transmitted to the sender and/or the recipient and/or the service provider of the delivery box.

It is yet another object of the present invention to provide a record of a document being transmitted to a receiver so as to provide proof of transmission of the document by delivery of the to be transmitted document to a secure delivery box which provides a copy of all documents being transmitted to the sender and/or the recipient and/or the service provider of the delivery box by a hard paper copy or soft electronic copy of the documents inserted into the delivery box.

It is still yet another object of the present invention to provide a record of a document being transmitted to a receiver so as to provide proof of transmission of the document by delivery of the to be transmitted document to a secure delivery box which provides a copy of all documents being transmitted to the sender and/or the recipient and/or the service provider of the delivery box by a hard copy or electronic copy of the documents inserted into the delivery box with the sender's address being visible through a transparent window of the to be delivered document or entered by an external keyboard of the delivery box.

It is still yet another object of the present invention to provide a record of a document being transmitted to a receiver so as to provide proof of transmission of the document by delivery of the to be transmitted document to a secure delivery box which provides a copy of all documents being transmitted to the sender and/or the recipient and/or the service provider of the delivery box by a hard copy or electronic copy of the documents inserted into the delivery box with the sender's address being visible through a transparent window of the to be delivered document or entered by an external keyboard of the delivery box so that copies and confirmation of delivery of transmitted documents is achieved.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
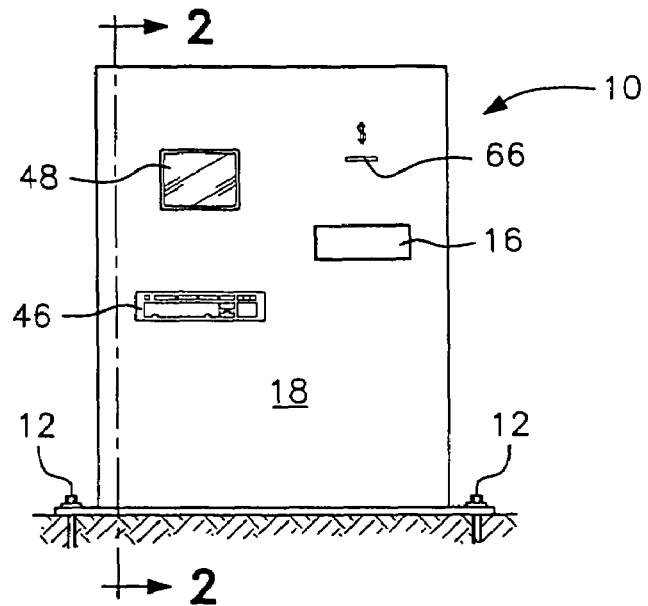
FIG. 1 is an end view of the secure delivery box of the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
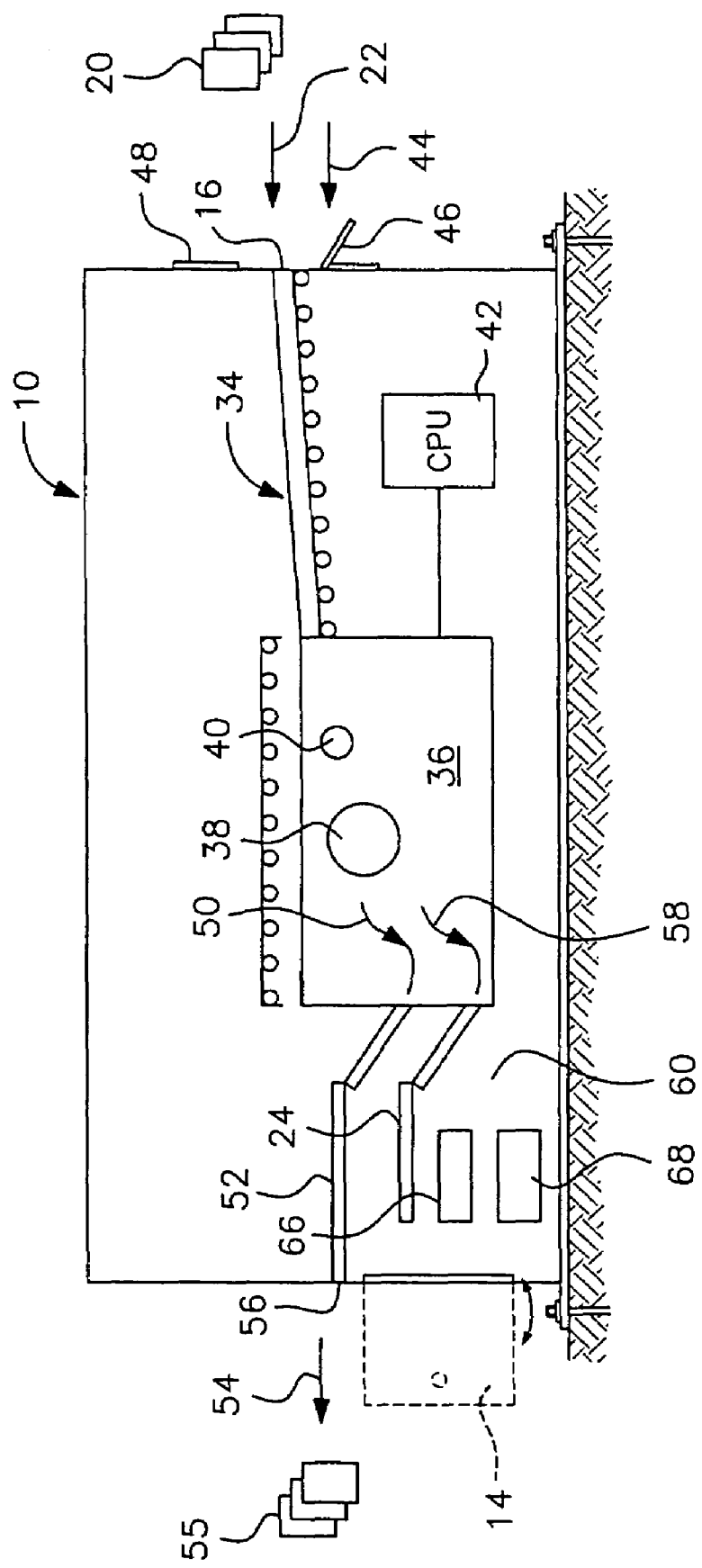
FIG. 2 is a sectional view taken along line 2-2 of FIG. 1 showing the internal copier/scanner, conveyor mechanism, lock door and computer control center of the present invention.

With reference to the drawings, in general, and to FIGS. 1 and 2 in particular, a system and method of providing proof of delivery embodying the teachings of the subject invention includes a secure delivery box 10. The delivery box 10 is made of steel or other similar material construction so as to provide a secure environment for its contents. The box 10 may be anchored to the ground by bolts 12 to ensure against movement of the box.

As shown in FIG. 2, access to the interior of the box 10 may be gained through pivotal doorway 14 for retrieval of documents to be delivered by a courier service. Additional openings may be provided for servicing of the interior of the box.

A document to be fed into the interior of the box is fed into slot 16 located at end 18 of the box. Alternatively, a plurality of documents 20 as shown in FIG. 2 may be fed into the slot 16 in a direction of arrow 22.

Figure 3:
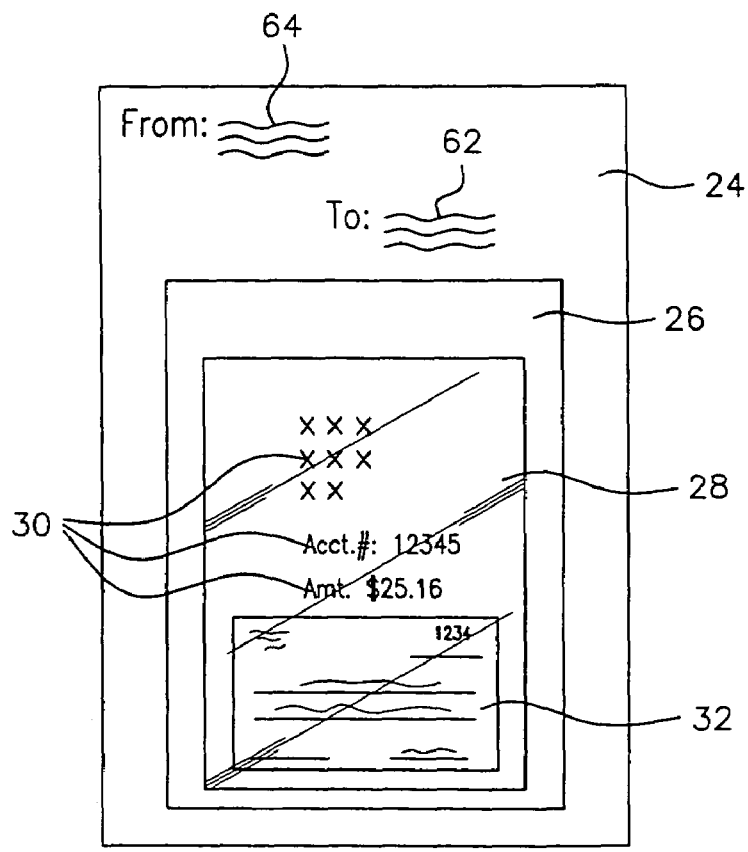
FIG. 3 is a plan view of an envelope which may be used to transmit payment information, for example, including a check which is copied to provide proof of delivery to the delivery box of a document.

In the embodiment where a single document is fed into the delivery box 10, reference is made to FIG. 3. In FIG. 3 exterior envelope 24 surrounds an interior cover page 26 having transparent portion 28 for viewing of indicia 30 representative of account information, amount of payment and viewing of check 32 for payment of an invoice, for example.

After entry into slot 16, cover sheet 26 may be transmitted by conveyor 34 to a copy device 36. The copy device includes a photocopy drum 38 or other electronic, digital copying device as well as a scanning bar 40 for electronically reading the cover page 26 and transmitting a record of the cover sheet, including indicia 30 and check 32 by a CPU 42 in the form of email. The intended recipients of an email copy of the cover letter 26 may be input to the CPU by pressing in the direction of arrow 44 on the keys of keyboard 46. A monitor 48 displays the information being entered by the keyboard.

As an additional mechanism of proof of delivery of the cover sheet 26 to the delivery box a hard copy 55 of the cover sheet is processed along path 40 and delivered by exit conveyor 52 to the sender who originally passed the cover sheet through inlet 16. A copy of the cover sheet is delivered in the direction of arrow 54 from exit port 56.

Meanwhile, the original cover sheet 26 is passed along in the direction of path 58. The original cover sheet either passes into holding compartment 60 to be later accessed through door 14 by an agent of the carrier or passes into external envelope 24 which can be printed with a delivery address 62, a return address 64 and even postage from a postage meter (not shown). Alternatively, depending on the number of pages of the copied document, box 66 or 68 may be selected for containing the original document pages.

Payment for the entire transaction may be made by cash or credit card fed into payment slot 66. The payment transaction can be confirmed on the monitor screen 48. If desired, a record of the payment of the transaction as well as the entire transaction may be processed by CPU 42 and a copy printed and passed along path 50 so as to be retrieved from exit port 56.

By this system and method, confirmation of delivery to a secure delivery box is made so that a confirmation of deposit of at least one document is provided to at least one of the sender, the recipients and the carrier exercising control over the deposit box. There can therefore be no question as to what documentation is being transmitted, as well as a specific date and time of the deposit.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A system for providing proof of delivery of documents, said system comprising
   a delivery box for deposit of at least one document being forwarded to a recipient by a sender,
   an inlet of said delivery box for irretrievably receiving the at least one document from the sender,
   a copying device located in said delivery box for copying the at least one document received in said delivery box and providing a copy in at least one of a printed and electronic format to at least one of the sender and the recipient, and
   a delivery package inside of the delivery box receiving the at least one document for subsequent delivery of the delivery package by a delivery service.

2. The system for providing proof of delivery of documents as claimed in claim 1, wherein said delivery box is secure against tampering for storing the received at least one document until retrieved by an agent of a delivery service.

3. The system for providing proof of delivery of documents as claimed in claim 1, wherein the copying device is a photocopier.

4. The system for providing proof of delivery of documents as claimed in claim 1, wherein the copying device is an image scanner.

5. The system for providing proof of delivery of documents as claimed in claim 1, wherein a keyboard is mounted on the delivery box for entry of data including a delivery address and a return address.

6. The system for providing proof of delivery of documents as claimed in claim 1, wherein the copying device delivers an electronic copy of the at least one document to the sender, the recipient and the delivery service exercising control over the delivery box.

7. A system for providing proof of delivery of documents, said system comprising
   a delivery box for deposit of at least one document being forwarded to a recipient by a sender,
   an inlet of said delivery box for irretrievably receiving the at least one document from the sender,
   a copying device located in said delivery box for copying the at least one document received in said delivery box and providing a copy in at least one of a printed and electronic format to at least one of the sender and the recipient, and
   a conveying device located between the inlet and the copying device and between the copying device and an outlet of the delivery box for transferring the at least one document to the copying device and for transferring a copy of the at least one document externally of the copying device.

8. The system for providing proof of delivery of documents as claimed in claim 7, wherein the conveying device transfers the at least one document into an envelope.

9. A method for providing proof of delivery of documents, said method comprising the steps of
   delivering at least one document to a secure box by a sender,
   passing the at least one document into the delivery box,
   copying the at least one document,
   forwarding a copy of the at least one document to at least one of the sender, an intended recipient and a custodian of the delivery box, and
   providing the copy of the at least one document to the sender from the secure box at the time of delivery of the at least one document to the secure box, and
   forwarding an additional copy of the at least one document to the intended recipient at the time of delivery of the copy to the sender.

10. The method for providing proof of delivery of documents as claimed in claim 9, wherein the copying is done by a photocopier.

11. The method for providing proof of delivery of documents as claimed in claim 10, wherein the copying is done by an image scanner.

12. The method for providing proof of delivery of documents as claimed in claim 11, wherein an email of the at least one document is transmitted from the delivery box.

13. The method for providing proof of delivery of documents as claimed in claim 9, further comprising providing delivery information to the at least one document when the at least one document is in the delivery box.

14. The method for providing proof of delivery of documents as claimed in claim 13, wherein the delivery information is provided by a keyboard mounted on the delivery box.

15. The method for providing proof of delivery of documents as claimed in claim 9, wherein a delivery service obtains the at least one document from the delivery box.

* * * * *